(12) United States Patent
Croak et al.

(10) Patent No.: US 7,983,404 B1
(45) Date of Patent: Jul. 19, 2011

(54) METHOD AND APPARATUS FOR PROVIDING PRESENCE STATUS OF MULTIPLE COMMUNICATION DEVICE TYPES

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1122 days.

(21) Appl. No.: 11/263,276

(22) Filed: Oct. 31, 2005

(51) Int. Cl.
*H04M 15/06* (2006.01)
*G06F 15/173* (2006.01)

(52) U.S. Cl. .................... 379/142.04; 709/224

(58) Field of Classification Search .......... 370/260, 370/329, 352, 389, 401; 379/88.17, 142.04–142.05, 379/221.05; 709/204, 206, 224; 455/413
See application file for complete search history.

(56) References Cited

U.S. PATENT DOCUMENTS

| | | | | |
|---|---|---|---|---|
| 7,035,390 | B2 * | 4/2006 | Elliott | 379/201.02 |
| 7,203,294 | B2 * | 4/2007 | Carnazza et al. | 379/142.07 |
| 7,269,162 | B1 * | 9/2007 | Turner | 370/352 |
| 7,317,716 | B1 * | 1/2008 | Boni et al. | 370/352 |
| 7,620,160 | B2 * | 11/2009 | Tidwell et al. | 379/88.25 |
| 7,668,157 | B2 * | 2/2010 | Weintraub et al. | 370/352 |
| 2003/0217142 | A1 * | 11/2003 | Bobde et al. | 709/224 |
| 2006/0190117 | A1 * | 8/2006 | Weczorek et al. | 700/103 |
| 2006/0271687 | A1 * | 11/2006 | Alston et al. | 709/227 |
| 2007/0015497 | A1 * | 1/2007 | Patel et al. | 455/418 |

* cited by examiner

*Primary Examiner* — Fan Tsang
*Assistant Examiner* — Mohammad Islam

(57) ABSTRACT

A method and apparatus for conveying presence information from distinct communication devices are disclosed. The present invention enables multiple communication devices using distinct communications technologies, such as cellular telephone, traditional wire line telephone, packet based telephone, and computer supporting instant messaging applications, to communicate presence status to a single server to enable another subscriber to determine the best method to use to establish a communication channel with a subscriber.

20 Claims, 4 Drawing Sheets

METHOD AND APPARATUS FOR PROVIDING PRESENCE STATUS OF MULTIPLE COMMUNICATION DEVICE TYPES

The present invention relates generally to communication networks and, more particularly, to a method and apparatus for providing presence status of multiple communication device types in communication networks, e.g., packet networks such as Voice over Internet Protocol (VoIP) networks.

BACKGROUND OF THE INVENTION

Business and residential customers are now increasingly using Presence Server to locate and find out if people are available to communicate with. Due to the increase in a variety of communication devices that individuals are using, distinct forms of presence that employ different communication technologies need to be considered in trying to locate and communicate with a subscriber. For instance, a subscriber may be using a cellular telephone, a traditional wire line telephone, a VoIP telephone, or a computer equipped with instant messaging applications, during various time periods in a day. For other subscribers to reach this particular subscriber, the presence status of the subscriber comprising the communication methods that can be used to reach the subscriber needs to be known to the other subscribers.

Therefore, a need exists for a method and apparatus for providing presence status of multiple communication device types in a packet network, e.g., a VoIP network.

SUMMARY OF THE INVENTION

In one embodiment, the present invention provides a method for conveying presence information from distinct communication devices. The present invention enables multiple communication devices using distinct communications technologies, such as cellular telephone, traditional wire line telephone, packet based telephone, and computer supporting instant messaging applications, to communicate presence status to a single server to enable another subscriber to determine the best method to use to establish a communication channel with a subscriber.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
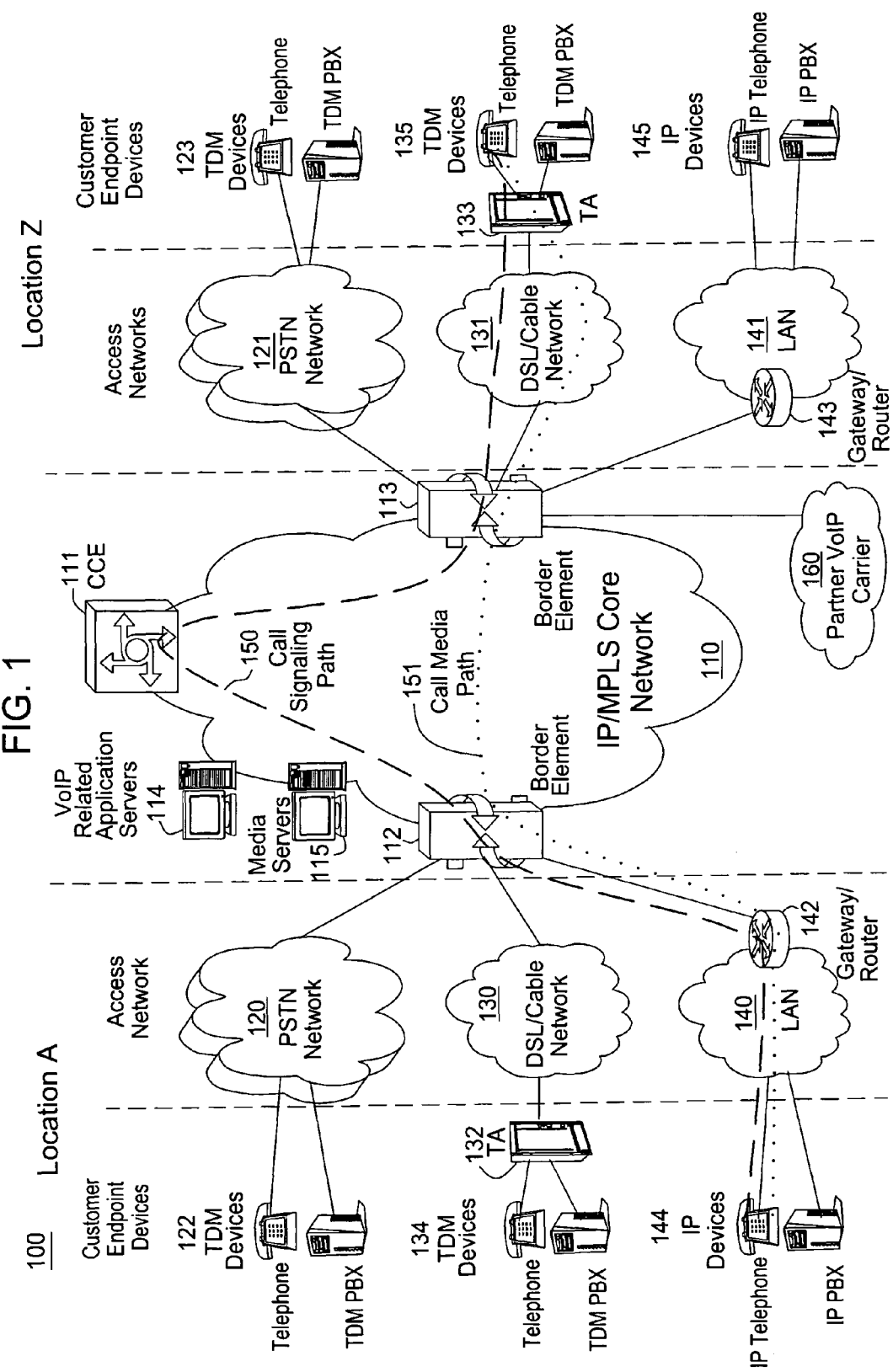
FIG. 1 illustrates an exemplary Voice over Internet Protocol (VoIP) network related to the present invention.

To better understand the present invention, FIG. 1 illustrates a communication architecture 100 having an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a SIP back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, teleconference bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Business and residential customers are now increasingly using Presence Server to locate and find out if people are available to communicate with. Due to the increase in a variety of communication devices that individuals are using, distinct forms of presence that employ different communication technologies need to be considered in trying to locate and communicate with a subscriber. For instance, a subscriber may be using a cellular telephone, a traditional wire line telephone, a VoIP telephone, or a computer equipped with instant messaging applications, during various time periods in a day. For other subscribers to reach this particular subscriber, the presence status of the subscriber comprising the communication methods that can be used to reach the subscriber needs to be known to the other subscribers. A Presence Server is a network element that tracks the location of users or resources, such as subject matter expert, and their availability status.

To address this need, the present invention provides a method for conveying presence information from distinct communication devices. The present invention enables multiple communication devices using distinct communications technologies, such as cellular telephone, traditional wire line telephone, packet based telephone, and computer supporting instant messaging applications, to communicate presence status to a single server to enable another subscriber to determine the best method to use to establish a communication channel with a subscriber.

Figure 2:
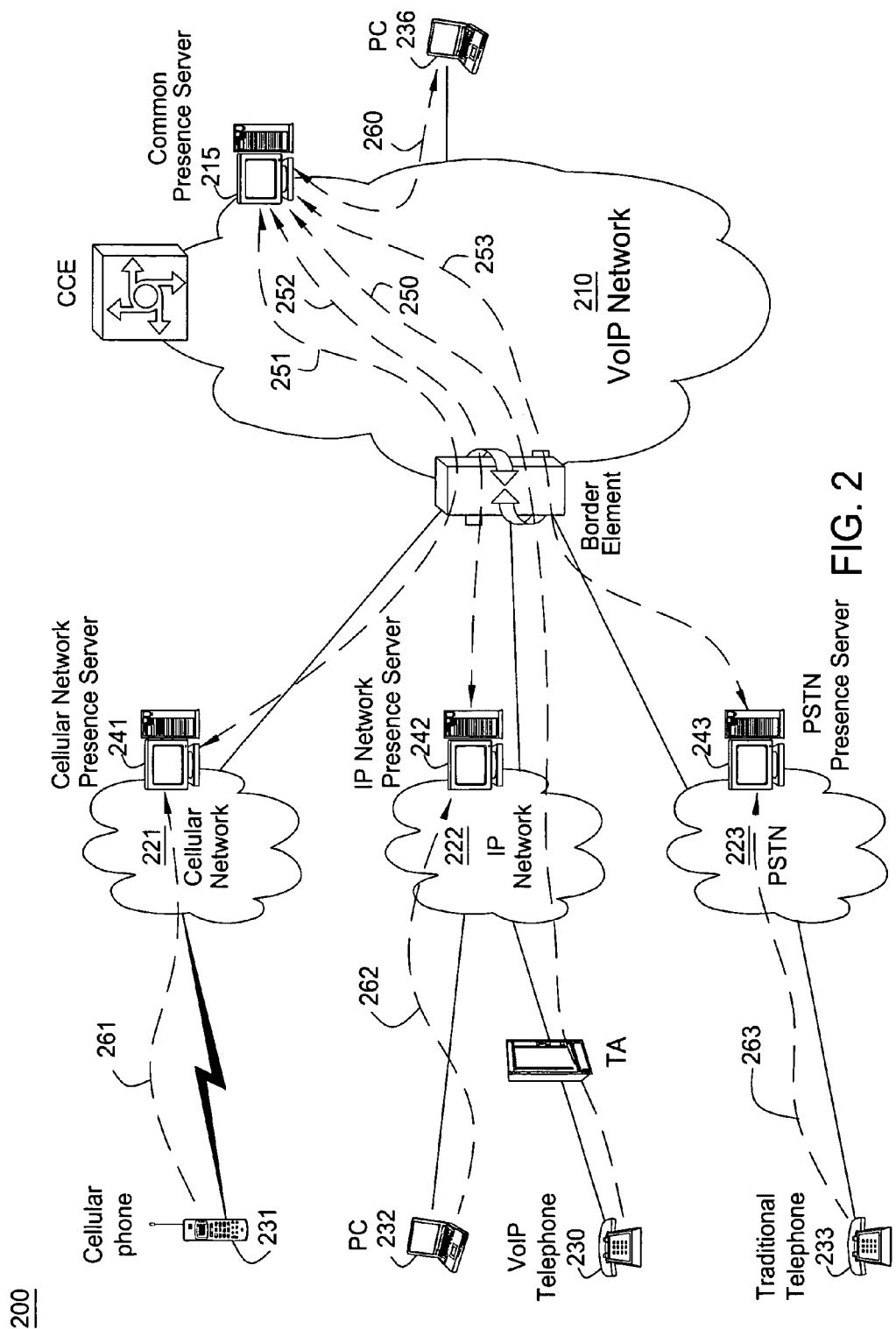
FIG. 2 illustrates an example of providing presence status of multiple communication device types in a VoIP network of the present invention.

FIG. 2 illustrates an example 200 of providing presence status of multiple communication device types in a packet network, e.g., a VoIP network of the present invention. In FIG. 2, a subscriber subscribes to multiple types of network services including cellular services, IP network services, VoIP telephone services, and traditional PSTN telephone services. The subscriber uses cellular phone 231 to access cellular services, PC 232 to access IP services, VoIP telephone 230 to access VoIP telephone services, and telephone 233 to access traditional PSTN telephone services.

When the subscriber turns on cellular phone 231, the presence of the subscriber via cellular phone 231 supported by cellular network 221 is sent to Cellular Network Presence Server 241 using flow 261. In turn, Cellular Network Presence Server 241 sends the presence status of the subscriber to Common Presence Server 215 using flow 251 to indicate that the subscriber is now available and can be reached by cellular phone 231. When the subscriber turns off cellular phone 231, the presence of the subscriber via cellular phone 231 supported by cellular network 221 is sent to Cellular Network Presence Server 241 using flow 261. In turn, Cellular Network Presence Server 241 sends the presence status of the subscriber to Common Presence Server 215 using flow 251 to indicate that the subscriber is no longer available via cellular phone 231.

When the subscriber uses PC 232 to sign on to an instant messaging (IM) session, the presence of the subscriber via an IM session on PC 232 supported by IP network 222 is sent to IP Network Presence Server 242 using flow 262. In turn, IP Network Presence Server 242 sends the presence status of the subscriber to Common Presence Server 215 using flow 252 to indicate that the subscriber is now available and can be reached via the IM session on PC 232. When the subscriber signs off the IM session using PC 232, the presence of the subscriber via the IM session on PC 232 supported by IP network 222 is sent to IP Network Presence Server 242 using flow 262. In turn, IP Network Presence Server 242 sends the presence status of the subscriber to Common Presence Server 215 using flow 252 to indicate that the subscriber is no longer available via the IM session on PC 232.

When the subscriber is available via VoIP telephone 230, the subscriber can enter a predefined Dual Tone Multiple Frequency (DTMF) signal to announce the subscriber's presence via VoIP telephone 230 to VoIP network 210. The presence indication is sent to Common Presence Server 215 using flow 250 to indicate that the subscriber is now available via VoIP telephone 230. Since the subscriber directly subscribes to VoIP services from VoIP network 210, the presence status can be sent to Common Presence Server 215 directly from VoIP telephone 230. When the subscriber will no longer be available via VoIP telephone 230, the subscriber can enter another predefined Dual Tone Multiple Frequency (DTMF) signal to renounce the subscriber's presence via VoIP telephone 230 to VoIP network 210. The presence indication is sent to Common Presence Server 215 using flow 250 to indicate that the subscriber will no longer be available via VoIP telephone 230.

When the subscriber is available via traditional telephone 233 supported by PSTN 223, the subscriber can enter a predefined Dual Tone Multiple Frequency (DTMF) signal to announce the subscriber's presence via traditional telephone 233 to PSTN Presence Server 243 using flow 263. In turn, PSTN Presence Server 243 sends the presence status of the subscriber to Common Presence Server 215 using flow 253 to indicate that the subscriber is now available and can be reached via traditional-telephone 233. When the subscriber will no longer be available via traditional telephone 233 supported by PSTN 223, the subscriber can enter another predefined Dual Tone Multiple Frequency (DTMF) signal to renounce the subscriber's presence via traditional telephone 233 to PSTN Presence Server 243 using flow 263. In turn, PSTN Presence Server 243 sends the presence status of the subscriber to Common Presence Server 215 using flow 253 to indicate that the subscriber will no longer be available via traditional telephone 233.

Furthermore, in FIG. 2, another subscriber or user using PC 236 can access the presence status of the subscriber from Common Presence Server 215 using flow 260. Thus, this other subscriber can now reach the subscriber accordingly based on the presence status obtained from Presence Server 215.

Figure 3:
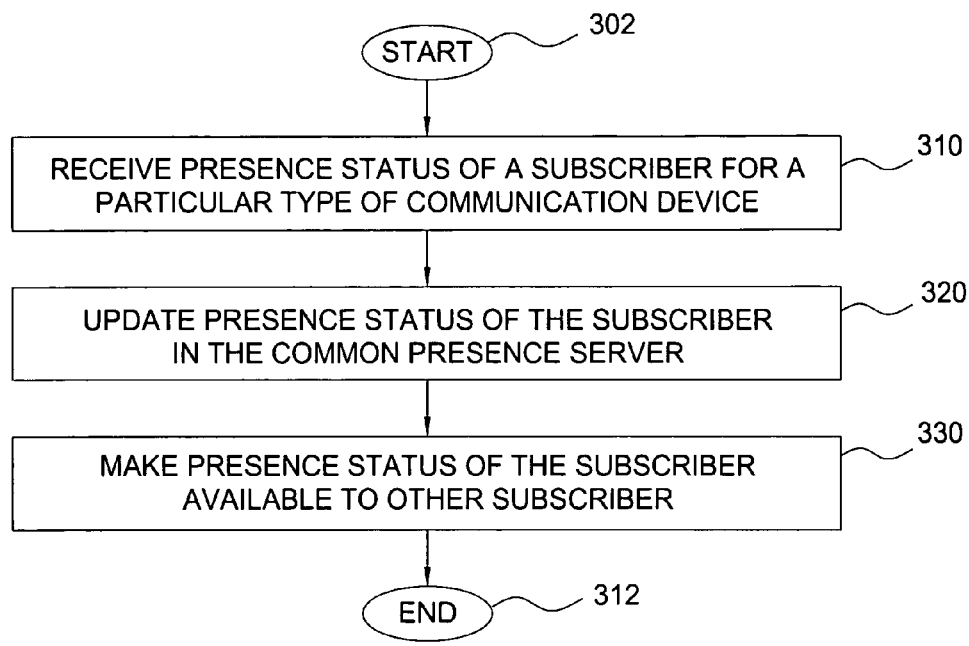
FIG. 3 illustrates a flowchart of a method for providing presence status of multiple communication device types in a packet network, e.g., a VoIP network, of the present invention.

FIG. 3 illustrates a flowchart of a method 300 for providing presence status of multiple communication device types in a packet network, e.g., a VoIP network, of the present invention. Method 300 starts in step 305 and proceeds to step 310.

In step 310, the method receives a presence status from a particular type of communication device used by a subscriber. For example, the presence status is received by a Common Presence Server. The types of communication devices that can be used by the subscriber include, but are not limited to, cellular phone, VoIP telephone, traditional PSTN telephone, and PC equipped with IM application. The Common Presence Server, therefore, can receive presence status from, but is not limited to, a cellular network presence server, a VoIP network presence server, a PSTN presence server, or an IP network presence server. If a subscriber directly subscribes to VoIP services from a VoIP network provider, the subscriber can update the presence status directly to the Common Presence Server. In this case, the Common Presence Server and a VoIP network presence server is the same network element. The presence status of the subscriber for a particular communication device type indicates the availability or unavailability of the subscriber through the particular communication device type.

In step 320, the method updates the existing presence status of the subscriber to incorporate the received presence status update for a particular communication device in the Common Presence Server. The presence status is updated by the Common Presence Server.

In step 330, the method makes available the latest presence status of the subscriber to be accessed by other subscribers. The method ends in step 340.

Figure 4:
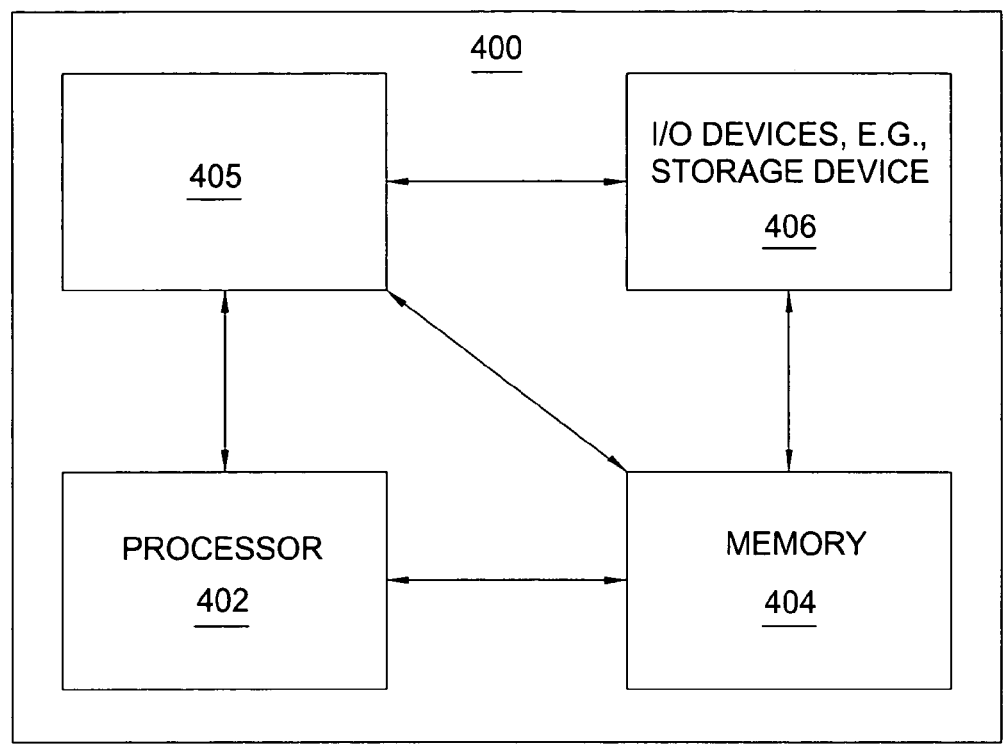
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a presence status module 405, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present presence status module or process 405 can be loaded into memory 404 and executed by processor 402 to implement the functions as discussed above. As such, the present presence status process 405 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a presence status in a communication network, comprising:

receiving presence status updates from a plurality of communication devices used by a single subscriber, wherein the receiving comprises receiving the presence status updates for each of the plurality of communication devices from a plurality of communication device specific presence servers, wherein each of the plurality of communication device specific presence servers is associated with a respective communication device type; and updating the presence status of each of the plurality of communication devices used by the single subscriber on a common presence server in the communication network.

2. The method of claim 1, wherein the communication network is an internet protocol network.

3. The method of claim 1, wherein the plurality of communication devices comprises a cellular telephone, a voice over internet protocol telephone, a public switched telephone network telephone, and a computer.

4. The method of claim 1, wherein the presence status indicates whether the single subscriber is available via one of the plurality of communication devices.

5. The method of claim 1, wherein the updating comprises:

modifying an existing presence status of each of the plurality of communication devices to incorporate one of the presence status updates.

6. The method of claim 1, wherein the plurality of communication devices comprises a cellular telephone, and a voice over internet protocol telephone.

7. The method of claim 1, wherein the plurality of communication devices comprises a cellular telephone, and a computer.

8. The method of claim 1, wherein the plurality of communication devices comprises a cellular telephone, and a public switched telephone network telephone.

9. The method of claim 1, further comprising:
    making the presence status of each of the plurality of communication devices accessible to other subscribers.

10. The method of claim 9, wherein the presence status is accessible via the common presence server.

11. A computer-readable medium having stored thereon a plurality of instructions, the plurality of instructions including instructions which, when executed by a processor, cause the processor to perform a method for providing a presence status in a communication network, comprising:
    receiving presence status updates from a plurality of communication devices used by a single subscriber, wherein the receiving comprises receiving the presence status updates for each of the plurality of communication devices from a plurality of communication device specific presence servers, wherein each of the plurality of communication device specific presence servers is associated with a respective communication device type; and
    updating the presence status of each of the plurality of communication devices used by the single subscriber on a common presence server in the communication network.

12. The computer-readable medium of claim 11, wherein the communication network is an internet protocol network.

13. The computer-readable medium of claim 11, wherein the presence status indicates whether the single subscriber is available via one of the plurality of communication devices.

14. The computer-readable medium of claim 11, wherein the plurality of communication devices comprises a cellular telephone, a voice over internet protocol telephone, a public switched telephone network telephone, and a computer.

15. The computer-readable medium of claim 11, wherein the updating comprises:
    modifying an existing presence status of each of the plurality of communication devices to incorporate one of the presence status updates.

16. The computer-readable medium of claim 11, further comprising:
    making the presence status of each of the plurality of communication devices accessible to other subscribers.

17. The computer-readable medium of claim 16, wherein the presence status is accessible via the common presence server.

18. An apparatus for providing a presence status in a communication network, comprising:
    a common presence server configured to:
        receive presence status updates from a plurality of communication devices used by a single subscriber, wherein the common presence server receives the presence status updates for each of the plurality of communication devices from a plurality of communication device specific presence servers, wherein each of the plurality of communication device specific presence servers is associated with a respective communication device type; and
        update the presence status of each of the plurality of communication devices used by the single subscriber on the common presence server in the communication network.

19. The apparatus of claim 18, wherein the communication network is an internet protocol network.

20. The apparatus of claim 18, wherein the presence status indicates whether the single subscriber is available via one of the plurality of communication devices.

\* \* \* \* \*